Sept. 26, 1944. H. J. BURNETT 2,359,199
FOOD DEHYDRATOR
Filed Aug. 3, 1940 4 Sheets-Sheet 1
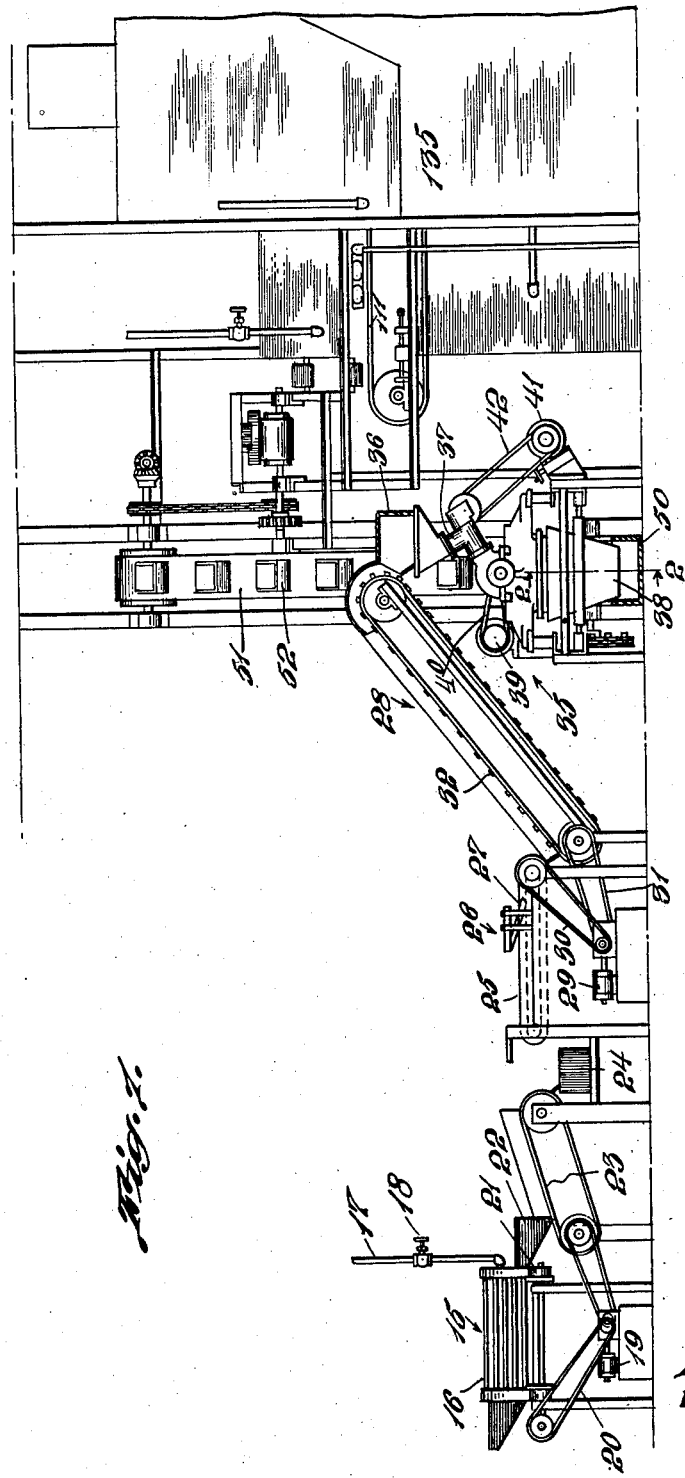
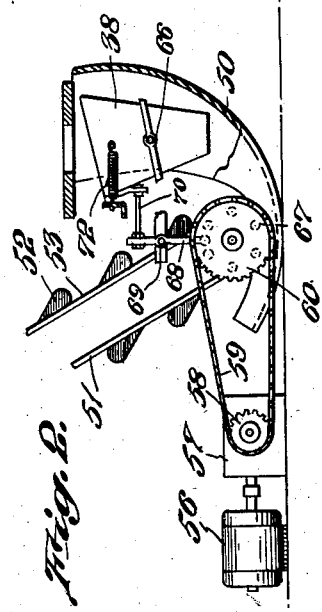
INVENTOR.
Henry J. Burnett
BY Barlow & Barlow
ATTORNEYS.

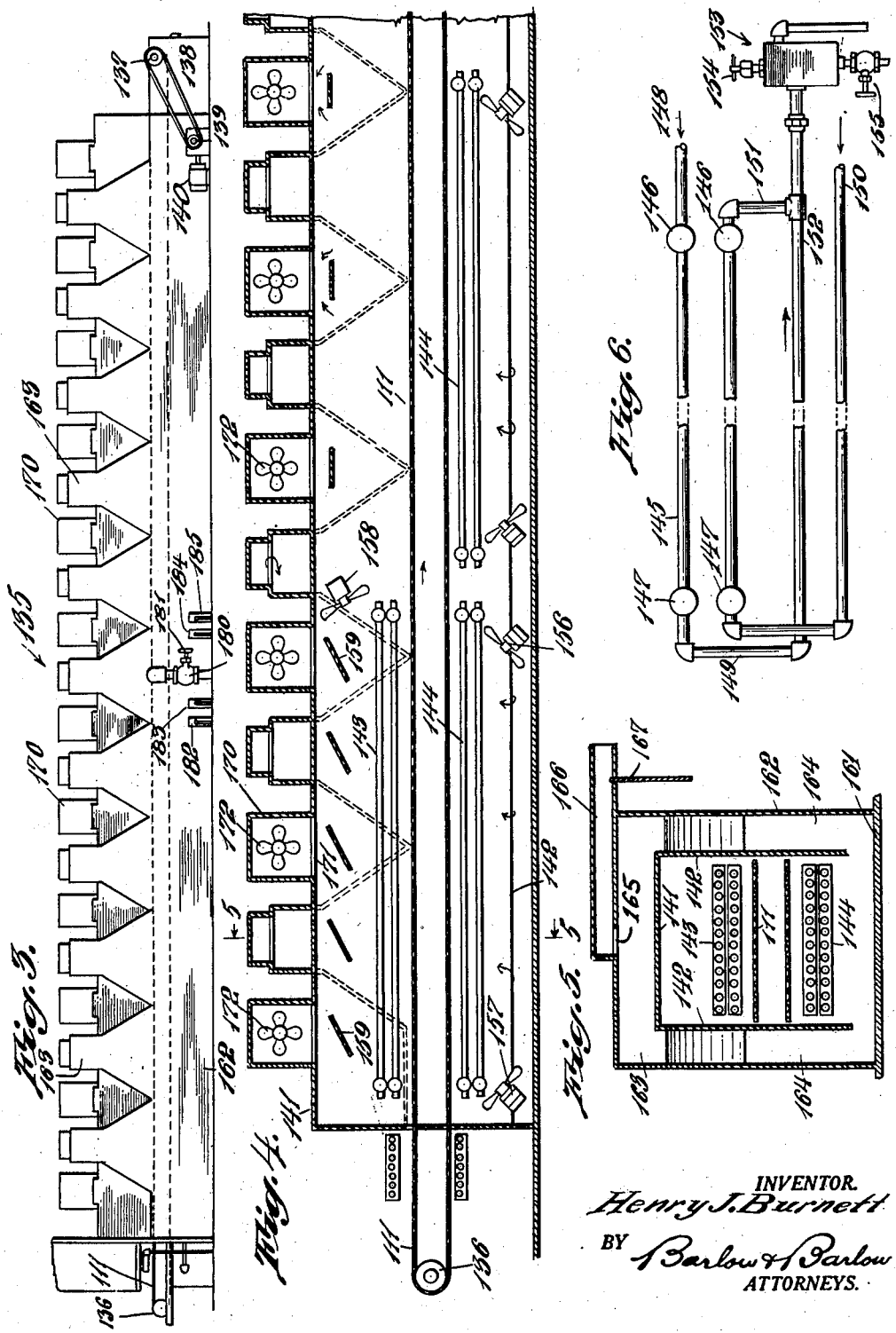

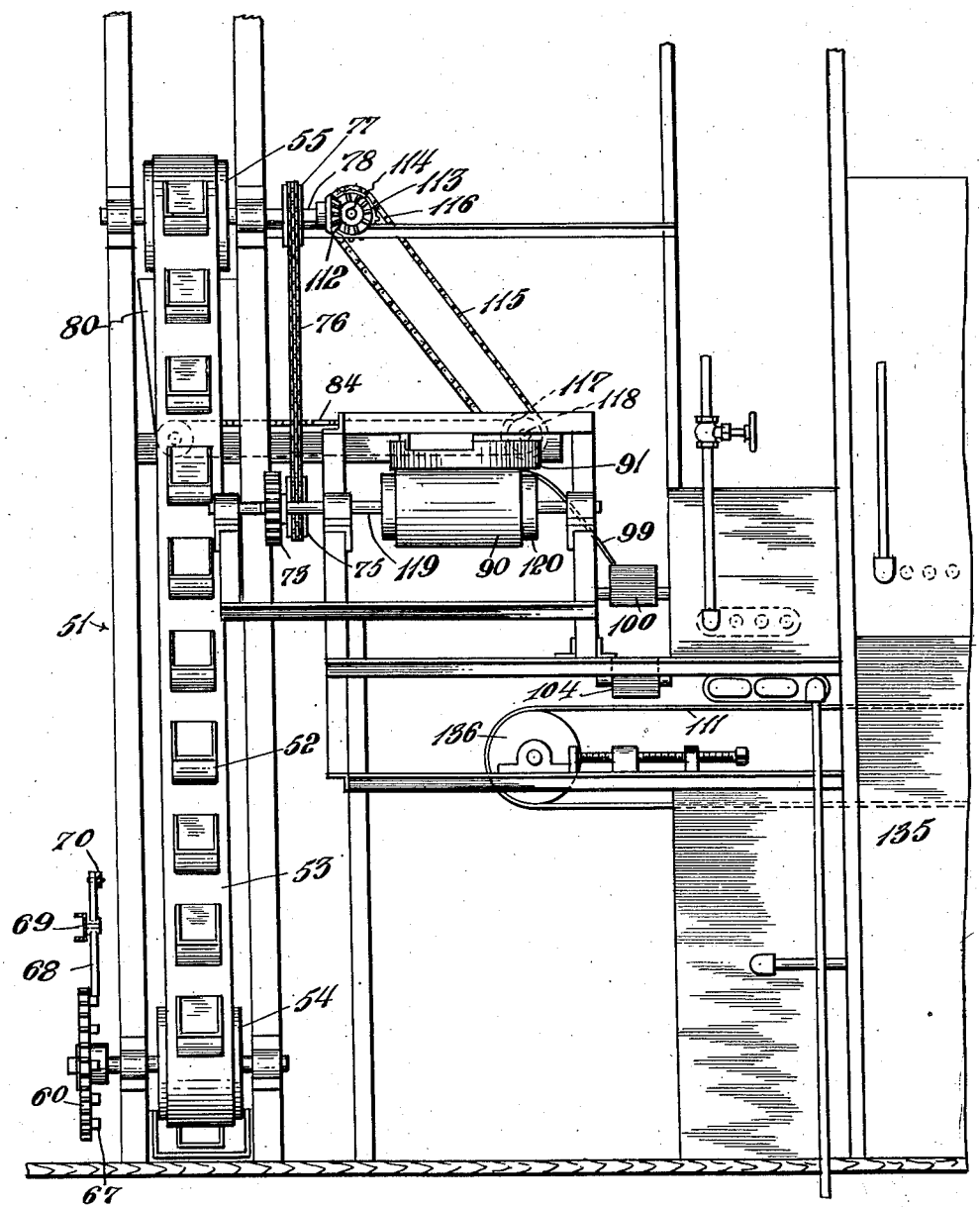

Sept. 26, 1944. H. J. BURNETT 2,359,199
FOOD DEHYDRATOR
Filed Aug. 3, 1940 4 Sheets-Sheet 4

INVENTOR.
Henry J. Burnett
BY Barlow & Barlow
ATTORNEYS.

Patented Sept. 26, 1944

2,359,199

UNITED STATES PATENT OFFICE 2,359,199

FOOD DEHYDRATOR

Henry J. Burnett, West Brookfield, Mass.

Application August 3, 1940, Serial No. 350,482

8 Claims. (Cl. 34—214)

This invention relates to an apparatus for dehydrating food and has for one of its objects to provide an apparatus which will remove a large portion of the moisture from a raw food.

Another object of the invention is to remove the moisture under such conditions that there will be little or no loss of the vitamin content of the raw food during such operation.

Another object of the invention is to remove or dehydrate the raw food quickly that oxidation will not occur.

Another object of the invention is to provide an apparatus in which the manipulation of the food product will be mechanical and very little manual operations or handling will be necessary.

A more specific object of the invention is to enhance and speed up the dehydration of the food product by the preliminary treatment of the same as to increase the circulation of air about the particles of the product.

Another object of the invention is to provide a flow of air in a sufficient amount so that there will never be a moisture saturation of the air, and efficient and speedy dehydration will be continually performed.

Another object of the invention is to provide a turbulent condition of the air which is to flow about the raw food product in order that all of the air may come in contact with the food.

Another object of the invention is to provide an aspirator effect for the drawing of the air through the raw food product.

Another object of the invention is to cause an even action of the air upon the food product by reason of the even distribution of the product on the conveying parts of the machine.

Another object of the invention is to provide an apparatus for dividing deposited quantities of the product to be treated and conveying the divided amounts for even distribution over the apparatus.

Another object of the invention is to so manipulate the parts of the apparatus to which the food product is liable to adhere that the work will be shaken loose or prevented completely from adhering by reason of a mechanical vibratory action of the parts.

With these and other objects in view, the invention consists of certain novel features of construction, as will be more fully described, and particularly pointed out in the appended claims.

In the accompanying drawings:

Fig. 1 is a side elevation of a portion of the apparatus utilized;

Fig. 2 is a detailed section showing in end elevation the hopper and a portion of the pick-up buckets and taken on substantially line 2—2 of Fig. 1;

Fig. 3 is a side elevation of a portion of the apparatus continuing that fragmental portion shown at the right of Fig. 1 but on a smaller scale;

Fig. 4 is a sectional view of a portion of the apparatus shown in elevation in Fig. 3 but on a larger scale;

Fig. 5 is a section on substantially line 5—5 of Fig. 4;

Fig. 6 is a diagrammatic view of two of the heating banks illustrated in Fig. 4;

Fig. 7 is a side elevation of certain of the conveying apparatus illustrated in Fig. 1 but on a larger scale;

Figure 8:
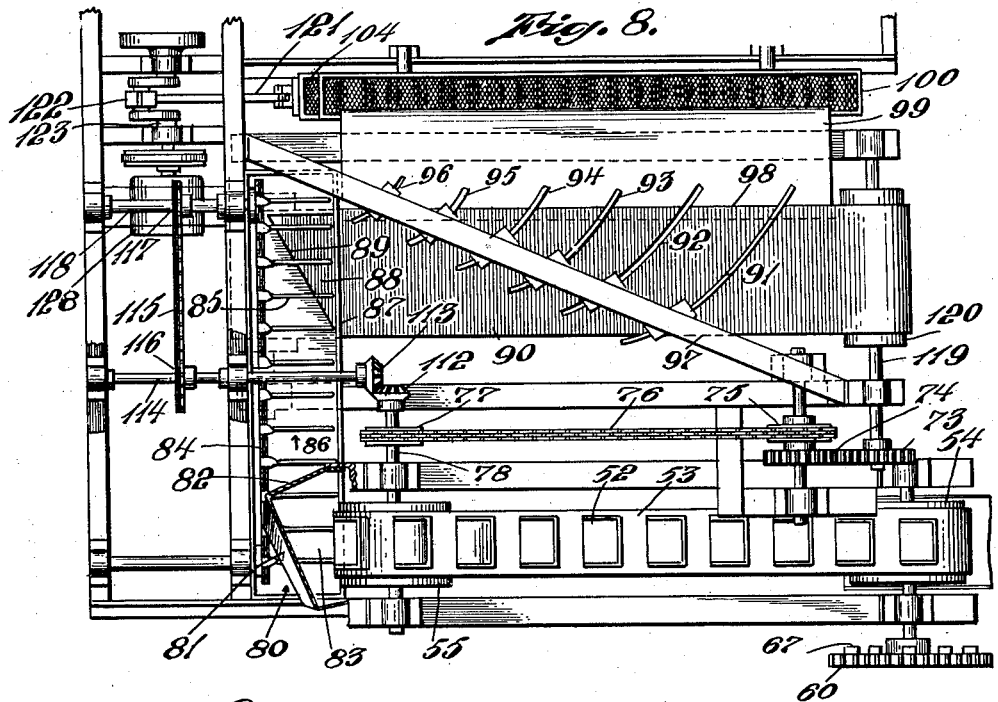
Fig. 8 is a top plan view of a portion of the conveying apparatus shown in Figs. 1 and 7.

In the preparation of a dehydrated food product such as raw carrots, it is desirable that these carrots be dehydrated under conditions whereby their high content of certain of the vitamins be maintained, which is accomplished by dehydrating at controlled temperatures relatively low and at a comparative rapid rate whereby oxidation does not occur. In order to accomplish this result, several different steps must be mechanically provided for, which I have done in a flow line apparatus whereby the carrots, or for that matter, any other food product, are first washed, are preliminarily sliced, ground, and conveyed through an arrangement where even distribution may be had to deposit the stock upon a reticulated travelling conveyor, such as a screen, which will cause the finely-divided food product to be dried in a plurality of different compartments that the drying action may be performed quickly and efficiently and the material discharged at the other end of the flow line. The drying is accomplished by warm, dry air and by direct radiation from the heating pipes to raise the temperature of the food. Rather close control of the temperature is maintained in order that the desired results may be accomplished; and the following is a more detailed description of the present embodiment of this invention, illustrating the preferred means by which these advantageous results may be accomplished:

With reference to Fig. 1, the raw food is first washed in an apparatus designated generally 15.

which is of the rotary barrel type cleaner in which water is operated by radial outward streams on the stock in the drum 16 formed of slats being equipped in their inner surfaces with brushes to clean off the dirt that may have accumulated on the raw stock. Suitable water is supplied through conduit 17 controlled as at 18. The drum is driven from the motor 19, drive belt 20 and surface drive pulleys 21. After the stock has engaged the brushes and streams of water have been passed over it, it is discharged through chute 22 onto the conveyor 23 where the results of the operation may be inspected by a person standing adjacent this location.

The washed product is then collected into a receptacle 24 from which the operator will manually dump the contents onto the conveying belt 25 of a slicing apparatus designated generally 26. This slicer consists of a plurality of knives 27 arranged in parallel, spaced relation so that as the raw food, such as carrot, moves with the conveyor, it will be cut by the knives into slices which will be discharged onto the conveyor belt 28. This slicer is operated from an electric motor 29 through belt 30 which also serves through belt 31 to drive the conveyor 28.

The conveyor 28 consists of a belt with a plurality of slats 32 across the same which will pick up the slices of the carrot and carry them to a grinding device designated generally 35. This grinder has a hopper 36 to receive the sliced carrots, conveying them to a chute 37 in which there is a worm to move them to the rotary grinder which pulverizes the carrot slices and discharges them into a hopper 38. A grinder which has been found suitable for this purpose is the "Mikro Pulverizer" which is available on the market. This grinding serves to pulverize the carrots in their own juices in such a manner that the solid part of the carrot absorbs any juices which may be extruded due to the pulverizing so that a pulp or mash of a semi-plastic and gelatinous material is provided. The rotor of this pulverizer is driven from the motor 39 and belt 40, while the worm is driven from a motor 41 through belt 42.

The hopper 38 in turn discharges into a scroll chute 50 into which a bucket belt 51 consisting of a plurality of buckets 52 flexibly connected by a belt 53 and trained over pulleys 54 and 55 extend so that as the carrot stock is deposited into this scroll chute, it will slide down the same and be picked up by successive buckets 52. This bucket conveyor is driven by a motor 56 through gear box 57, sprocket gear 58, sprocket chain 59 and sprocket gear 60.

Sprocket gear 60 has a plurality of pins 67 extending therefrom which rock a lever 68 pivoted as at 69 to impart through link 70 a vibratory action on the chute 38 pivoted as at 66, the same being moved in one direction by spring 72 and in the other direction by the mechanical impulses just explained. By this arrangement the chute continues to shake so that the sticky stock will not adhere to the same but will continue to be discharged into the scroll chute to be picked up by the buckets and maintain a more even flow of the food material to the dehydrator.

The pulverized food stock is discharged against a deflector plate 80 (see Fig. 8) which is at such an angle by reason of its walls 81 and 82 that it causes the pulverized semi-plastic mash to be deposited diagonally of a trough 83. A sprocket chain 84 has one of its lengths just above the trough with arms 85 fastened to the chain so as to sweep across the upper surface of the trough and carry along the trough in the direction of arrow 86 the mash which is deposited diagonally of the trough.

This trough has a suitable side wall 87 so as to prevent the ground stock at the free ends of the arms 85 from sliding off the same. An opening 88 is provided in the trough at the end thereof with a diagonal edge 89 so that as the stock is pushed along by the arms 85, it will be pushed over this edge 89 and dropped through the opening 88. Below this opening there is a travelling belt 90 running at right angles to the direction of the trough and, as the opening 89 is diagonal of the trough and also diagonal of this belt 90, the stock so pushed over the edge 89 will be deposited evenly widthwise of the belt 90, although diagonally thereof.

Above this belt 90 there are supported a plurality of curved fins 91, 92, 93, 94, 95 and 96 suspended from the support bar 97 above the belt which is a part of the framework of the machine, it being understood that suitable framework for supporting the moving parts in their desired relation is provided. The ends of each of these fins are progressively arranged at different distances widthwise of the belt 90 so that the stock is progressively deflected along the curved fin which is at such a curvature as to cause the belt to give the stock some forward movement which will assist in its deflection along the fin for discharging the same over the edge 98 of the belt. In this manner, the stock is divided into a plurality of different divisions and is evenly distributed onto the inclined apron 99 over which the stock slides into the shaker 100.

Figure 9:
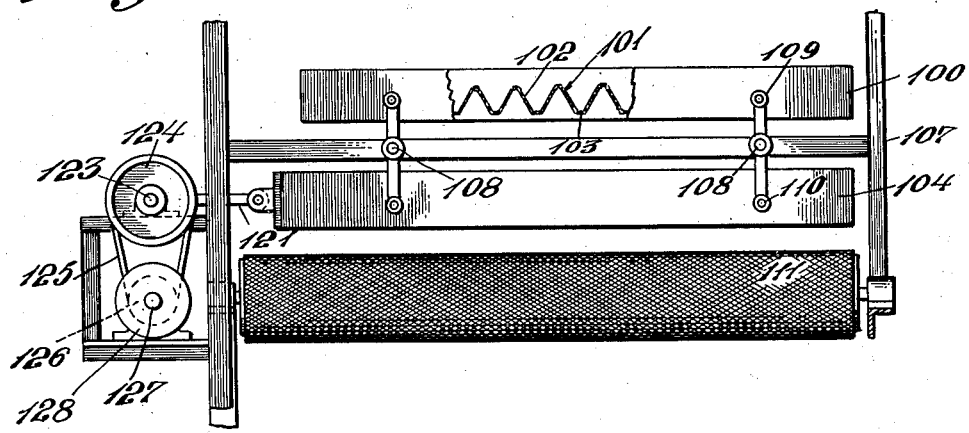
Fig. 9 is a detailed end elevation of the vibratory sifters at the head of the dehydrator.
Figure 10:
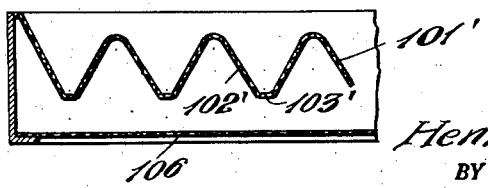
Fig. 10 is a detailed sectional view of the bottom sifter.

This shaker is made up of side walls and end walls with a screen in undulating form 101 for its bottom wall, as shown in Fig. 9. The inclined wall portions 102 and a short bottom portion 103 provide a form having reticulated sides to advantageously discharge pulp when vibrated. Below this shaker there is a similar shaker having an undulating screen 101' with similar side walls 102' and bottom wall 103' and also a bottom screen of a little larger mesh in a single plane designated 106. The undulations of the screen 101' are greater than the undulations of screen 101, while the screen 106 is in a single plane.

The framework 107 of the apparatus pivotally supports links 108 which are connected to the shakers 100 and 104 at 109 and 110 which serve to support the shakers. Means for oscillating these shakers lengthwise is provided, the arrangement being such that when one shaker moves in one direction, the other shaker will move in the other direction, each assisting to evenly and lightly deposit the pulp in a layer onto a travelling belt in the form of a screen designated generally 111.

The drive for the conveying apparatus may be taken from shaft 78 which is driven through the conveyor 51, through bevel gears 112, 113, shaft 114 which through sprocket 116, chain 115 drives sprocket gear 117, shaft 118 to drive the chain 84. The drive for the belt 90 is also taken from shaft 78 through sprocket 77, sprocket chain 76, sprocket gear 75 to gears 74, 73 on shaft 119 upon which the roll 120 is mounted and about which the belt 90 is trained. The vibratory movement of shakers 100 and 104 is through link 121, crank 122 on shaft 123 driven by pulley 124 from belt 125 engaging pulley 126 on shaft 127 driven by motor 128.

The travelling belt 111 projects beyond the dehydrator which may be designated generally 135 and is seen in elevation in Fig. 3. This belt 111 is of some known non-oxidizing material such as stainless steel with which the stock may contact without danger of destroying any of its desirable food properties and is variously supported along its travel by suitable anti-friction means, passing over pulley 136 at the head end and pulley 137 at the other end where a drive to belt 138 over pulley 139 from motor 140 is provided.

This dehydrator consists of a plurality of separate sections each of which is a similar separate chamber, there being four shown. The first section differs from the other three, which are substantially alike, in several details which will be pointed out. Each section has a housing (see Fig. 5) consisting of a top wall 141 and side walls 142 spaced from the bottom or floor and built about the conveyor belt 111. Within this housing there is supported a bank 143 and a bank 144 of heating pipes. The bank 143 is above the conveyor belt, while the bank 144 is below. Steam is passed through these pipes and each bank is arranged in two sections so that there will be an inlet at one end and a discharge at the other end in alternate arrangement. The alternate arrangement enables an even distribution of heat to be provided. This arrangement is shown in Fig. 6 in which one section is designated 145 having headers at 146 and 147, there being an inlet 148 to the header 146 and a discharge 149 from the header 147. The other section also has headers 146 and 147, but in this case, the inlet at 150 will be to the header 147 and the discharge 151 will be from the header 146. There is a common discharge 152 to a condensing trap 153 which may be controlled as at 154 and 155 that the amount of heat provided in the sections may be under control. A valve controlling the inlet will of course be provided for each individual bank.

In the first section the two heating banks indicated at 143 and 144 will be provided, while in the second and successive sections there will be only bank 144 provided at the bottom. Fans 156 and 157 will be provided in each section to drive the incoming air to direct it to the lower portion of the section upwardly through the heating banks and through the screen on which the work is deposited, while some radiation of the heat from each bank will also serve to warm up the pulp. The function of the upper bank 143 in the first section is to dry or cause contraction of the particles of ground or finely-pulverized pulp so that a space will be provided about these particles to assist in the circulation of air passing therethrough in each of the succeeding sections. A fan 158 is also provided above the conveyor belt which is directed to cause air to pass lengthwise of the belt, usually in the opposite direction to the travel of the belt, so as to afford an aspirator action drawing up the air through the belt from below. Baffles 159 are located at spaced points along the section which may be adjusted to cause the deflection of the air so driven parallel to the belt downwardly successively as desired.

The air which is taken in is conveyed about the top wall 141 or side walls 142 in conduits formed by a housing about the top and side walls 141 and 142 extending to the floor or bottom wall 161 which are conveniently arranged by the provision of an outer wall 162 which taper to communicate with a duct 163 extending across the top of the wall 141 and with the space 164 between the walls 142 and 162. The supply conduit 166 controlled by damper 167 delivers air through opening 165 into the conduit 163 across the top of the housing, then down each side of this housing and beneath the walls 142 at either side thereof and then upwardly through the banks of the heating coils and a conveyor belt where it may be discharged through the conduits 170 communicating with the housing through opening 171, there being an exhaust fan 172 in each of these discharge conduits to asssist in the discharge of air therefrom. In the particular structure just described the fresh air enters and flows through the conduit 166 and passes through the opening 165 which is centrally located with respect to the dehydrator chamber, and then divides and passes down in the space on either side of the inner drying chamber and absorbs heat radiated in these spaces by the walls 142 of the inner chamber and is preheated thereby prior to passing beneath the lower edge of the walls 142 into the lower half of the dry chamber. This incoming air is further distributed by the flaring walls provided on each side of the dehydrator which will cause a uniform flow of incoming air to pass beneath the lower edges of the wall 142. In this arrangement I am able to control the volume of air admitted to each section so as to assure a uniform flow of fresh air over each section of the food being dried. This arrangement also permits the proper control of dry bulb temperature of the lower half of the chamber which will affect the wet bulb temperature of the food product being dehydrated, and consequently I am able to maintain the wet bulb at a temperature as low as practicable to preserve the vitamin content of the food and maintain a large uniform volume of fresh air constantly flowing through the chambers, and quickly exhaust the air before the same becomes saturated.

The first section of the dehydrator will be maintained at, for example, 120° F. which will be warmer than the succeeding sections which may be 115° F., as more moisture will be present in the pulp in this first section the wet bulb temperature of the stock or work due to evaporation will be lower than the surrounding heated air which will be supplied, and thus to speed drying heated air above that at which the stock may be handled without loss of value may be had. Since moisture passes from the pulp, the temperature will be reduced so that at no time will the pulp itself, or dried food, reach a temperature where injury to its vitamin content may occur. In the case of carrots, the drying will be at between 65-115 degrees F., and the travel of the belt will be such that the drying operation will be performed in a period of from 25 to 70 minutes.

The main unit for the steam which is utilized in the banks for heating is designated 180 with the control at 181. Individual controls for each of the sections are provided at 182, 183, 184 and 185. Indications of conditions within the dehydrator may be provided for each section whereby the control may be known and if desired automatically controlled.

I claim:

1. In an apparatus for treating a food product, a closed compartment, a reticulated conveyor belt passing through said compartment, a bank of heating elements beneath said belt, a bank of heating elements above said belt, a plurality of baffle plates spaced from each other and positioned at an angle to said belt and at a location above said heating element positioned above said belt, means below said belt for directing air upwardly through said belt and means above the belt directing air towards said baffles to cause the air to travel generally parallel to the plane of the belt to provide an aspirator action for the upwardly-directed air.

2. In an apparatus for treating a food product comprising a plurality of compartments each having air inlets and outlets open to the atmosphere, means for individually heating and controlling the heat in each compartment, a conveyor belt passing successively through said plurality of compartments, means for directing the air from the inlet to cause the air to travel to the lower portion of each compartment and means to cause the air in the lower portion of each compartment to travel upwardly through the conveyor belt and additional means to cause the air to travel over the upper surface of the belt in a direction generally parallel thereto.

3. An apparatus for treating a food product comprising a plurality of compartments each having air inlets and outlets opening into the atmosphere, a conduit leading from said air inlets to the lower portion of said compartments, a reticulated conveyor belt passing successively through said compartments, separate heating elements positioned above and beneath said belt, and means directing air upwardly across the lower positioned heating elements and through said belt, and means directing air across said upper positioned heating elements and over the food product to be acted on and baffles positioned at a location above said heating elements to aid in directing the circulation of air over said food product in a direction generally parallel to the plane of the belt.

4. An apparatus for treating a food product comprising a plurality of compartments each having air inlets and outlets opening into the atmosphere, a conduit leading from said air inlets to the lower portion of said compartments, a reticulated conveyor belt passing successively through said compartments, one of said compartments having separate heating elements positioned above and beneath said belt and means positioned at each end of the said lower positioned heating elements for directing air upwardly thereacross and through said belt and means directing air across said upper positioned heating elements and over the food product to be acted on, and a plurality of baffles positioned above said belt and arranged to aid in directing the air across the said food product in a direction generally parallel to the plane of the belt, some of said baffles being positioned adjacent the openings of said air outlets.

5. An apparatus for treating a food product comprising an elongated chamber opened at the bottom thereof providing an air inlet thereto and having a plurality of air outlets opening into the upper portion thereof, an endless reticulated conveyor belt extending from one end of said chamber to the other for conveying food products to be treated through said chamber, banks of heating elements spaced from each other and positioned beneath said belt, heating elements positioned above said belt at one end of said chamber, means for separately controlling said heating elements, means at the ends of the said heating elements positioned beneath said belt for directing air upwardly across the surface thereof and through said belt and means positioned at one end of the upper positioned heating elements for directing air across the surface thereof and over the food product in a direction generally parallel to the plane of the belt and baffles in the upper portion of said chamber and adjacent to the air outlets and positioned at an angle with respect to a horizontal plane to aid in directing the circulation of air over the food product.

6. An apparatus for treating a food product comprising an elongated chamber free of physical partition and provided with an entrance at one end thereof and in which chamber a plurality of heating elements are provided and distributed therein in such manner and individually controlled to provide a plurality of progressively cooler compartments, with the warmer compartment adjacent to the said entrance, a reticulated endless conveyor belt extending through said chamber for successively carrying food products to be acted on through said compartments, means to direct air by said heating elements over and about said food product, and a plurality of spaced air outlets located in the upper portion of each compartment for exhausting air therefrom for substantially preventing air from one compartment to flow through the other.

7. A dehydrator apparatus comprising an elongated chamber provided with an entrance at one end thereof and in which chamber a plurality of heating elements are provided and distributed therein in such manner and individually controlled to provide a plurality of progressively cooler compartments, with the warmer compartment adjacent to the said entrance, a reticulated endless conveyor belt extending through said chamber for successively carrying the products to be acted on through said compartments, means to direct air by said heating elements over and above said product, and an air outlet in each compartment for exhausting air therefrom for substantially preventing air from one compartment to flow through the other.

8. A dehydrator apparatus comprising a chamber open at the bottom on either side thereof providing air inlets thereto, means in said chamber for heating the same, an air conduit extending about said chamber the walls of which include the top and side walls of said chamber, said conduit having an air inlet therein opening in the upper portion of said conduit at a location substantially midway between the side walls of said chamber so as to substantially equally distribute the entering air in said conduit to either side of said chamber, said conduit having tapered walls on either side of said chamber converging towards the air inlet in said conduit for distributing the air flowing therein substantially equally along the bottom of said chamber.

HENRY J. BURNETT.